(12) United States Patent
Callahan et al.

(10) Patent No.: US 6,287,730 B1
(45) Date of Patent: Sep. 11, 2001

(54) HYDROPHILIC POLYOLEFIN HAVING A COATING CONTAINING A SURFACTANT AND AN EVOH COPOLYMER

(75) Inventors: Robert W. Callahan; Khuy Van Nguyen, both of Charlotte, NC (US)

(73) Assignee: Celgard Inc., Charlotte, NC (US)

( * ) Notice: Subject to any disclaimer, the term of this patent is extended or adjusted under 35 U.S.C. 154(b) by 0 days.

(21) Appl. No.: 09/134,622

(22) Filed: Aug. 14, 1998

(51) Int. Cl.$^7$ ........................................... H01M 2/16
(52) U.S. Cl. ................... 429/249; 429/250; 429/247; 429/246
(58) Field of Search ............................ 429/247, 249, 429/250, 246

(56) References Cited

U.S. PATENT DOCUMENTS 4,501,793 * 2/1985 Sarada ................... 428/315.5

FOREIGN PATENT DOCUMENTS

| 0203459 | 12/1986 | (EP) . |
| 0498414A2 | 8/1993 | (EP) . |
| 0203459 | 12/1996 | (EP) . |
| 2-133607 | 5/1990 | (JP) . |
| 2-133608 | 5/1990 | (JP) . |
| 3-55755 | 3/1991 | (JP) . |
| 4-346825 | 5/1991 | (JP) . |
| 5-106112 | 10/1991 | (JP) . |
| 8131789 | 5/1996 | (JP) . |
| 8311771 | 11/1996 | (JP) . |

* cited by examiner

Primary Examiner—Laura Weiner
(74) Attorney, Agent, or Firm—Robert H. Hammer, III

(57) ABSTRACT

The present invention is directed to a hydrophilic polyolefin article comprising a polyolefin article having a coating containing a surfactant and an ethylene vinyl alcohol (EVOH) copolymer.

12 Claims, No Drawings

HYDROPHILIC POLYOLEFIN HAVING A COATING CONTAINING A SURFACTANT AND AN EVOH COPOLYMER

FIELD OF THE INVENTION

The instant invention is a hydrophilic polyolefin article in which a hydrophobic polyolefin article is coated with a mixture of surfactant and EVOH.

BACKGROUND OF THE INVENTION

Hydrophilic refers to the ability to "wet-out" a liquid. "Wet-out" refers to the ability to cause a liquid (e.g., an aqueous solution) to penetrate more easily into, or spread over the surface of another material. Generally, polyolefins are considered hydrophobic. Hydrophobic refers to the inability to "wet-out" a liquid.

Various methods to make polyolefins more hydrophilic generally include: coating with a surfactant (or surface active agent or wetting agent); coating with a polymer(s), the polymer(s) having different (i.e., better) surface active properties than the polyolefin; surface activation (e.g., by plasma treatment); surface roughing to increase surface area (e.g., foaming the surface); and blending the polyolefins with another polymer(s), the blend having different (i.e., better) surface active properties than the polyolefin. Examples of the foregoing are illustrated in Japanese Kokai Nos.: 2-133608 (published May 22, 1990); 2-133607 (May 22, 1990); 3-55755 (Mar. 11, 1991); 4-346825 (Dec. 2, 1992); and 5-106112 (Apr. 17, 1993); and European Patent Publication Nos. 498,414 A2 (Aug. 12, 1992); 634,802 A1 (Jan. 18, 1995); and 203,459 A2 (Dec. 3, 1986).

In the foregoing methods, the hydrophilicity of the polyolefin may degrade over time. Accordingly, there is a need for a permanently hydrophilic polyolefin.

SUMMARY OF THE INVENTION

The present invention is directed to a hydrophilic polyolefin article comprising a polyolefin article having a coating containing a surfactant and an ethylene vinyl alcohol (EVOH) copolymer.

DETAILED DESCRIPTION OF THE INVENTION

Polyolefins are a class or group of thermoplastic polymers derived from simple olefins. Polyolefins generally include polyethylene, polypropylene, polybutylene, polymethyl pentene, and copolymers thereof. Polyolefins articles generally include fibers and films, but also include microporous films and microporous hollow fibers. Microporous refers to an article which has a plurality of pores with effective diameters of 1 micron or less. Hydrophobic polyolefins refer to polyolefins having surface energies equivalent to or less than the surface energy of polyethylene.

The polyolefin article is made hydrophilic by a coating. The coating contains a surfactant and an ethylene vinyl alcohol (EVOH) copolymer. Preferably, the coating is applied as a mixture of the surfactant and EVOH, but the coating may also be applied serially, e.g. first apply the surfactant, and then apply the EVOH. Preferably, the coating is added onto the article at an average weight percentage in the range of 10–25 based upon the weight of the article. It is believed that the addition of the surfactant to the EVOH facilitates the adhesion of the EVOH to the article, and thereby increases the permanency of the coating.

The coating is preferably applied to the surface in solution form. The solution may comprise an alcohol/water (preferably 60:40 propanol:water) and no more than 0.9% by weight surfactant and between 1.5–3% by weight EVOH. The amount of surfactant is balanced so that the surfactant does not cause wetting. Of the surfactants named herein, no more than 0.9% should be use. Preferably, the range should be from 0.7 to 0.9% by weight. The amount of EVOH is chosen to insure consistent wetting of the surface but to avoid pore blockage. At less than 1.5% wetting becomes erratic. At greater than 3.0% pore blockage is likely to occur. Preferably, the range should be from 2.0 to 3.0% by weight.

After application, any application method is appropriate, the alcohol/water portion is driven off, e.g., by drying including forced hot air dying, and the article is ready for use.

The surfactant is any one capable of raising the surface energy of the polyolefin to about 48 dynes/cm. Those surfactants include, but are not limited to, polyethylene glycol diolate, nonylphenoxypoly(ethyleneoxy) ethanol, triethylene glycol divinyl ether, and combinations thereof. Polyethylene glycol diolate is available as MAPEG D0400 from PPG Industries, Inc. of Gurnee, Ill. Triethylene glycol divinyl ether is available as Rapidcure DVE-3 from ISP Technologies Inc. of Wayne, N.J. Nonylphenoxypoly (ethyleneoxy) ethanol is available as Igepal CO 660 from Rhone-Poulenc Surfactants and Specialties, Inc. of Cranberry, N.J.

The EVOH may be any commercially available EVOH copolymer. Preferably, the EVOH has about 38 mole % of ethylene monomer. Suitable EVOH copolymers include: Soarnol K3835N from Nippon Goshei of Osaka, Japan; and EVAL F104 from Eval Company of America, Lisle, Ill.

The foregoing hydrophilic polyolefin articles may be used in any application where a hydrophilic polyolefin is necessary or desirable, for example, air filtration, air cleaning, water filtration, water cleaning, water purification, medical equipment, separation equipment, semiconductor manufacture, battery cell separator (particularly for batteries having aqueous based electrolytes), ultrafiltration equipment and the like.

With regard to battery cell separators, the coating is applied to one or preferably both surfaces of the microporous polyolefin membrane. Such membranes are commercially available from: CELGARD LLC, Charlotte, N.C.; Tonen KK, Tokyo, Japan; Asahi Chemical Industry Co., Ltd., Tokyo, Japan; Nitto Denko Corp., Osaka, Japan; and Ube Industries Ltd., Tokyo, Japan. This coated separator is particularly suitable for aqueous alkaline secondary battery. Such batteries include, but are not limited, nickel metal hydride (NiMH), nickel cadmium (NiCd), and zinc air batteries. In such uses, preferably about 50–90% (most preferably 60–80%) of the separator's surface is coated. Partial coating is preferred because it facilitates gas permeability. During the recharging of alkaline secondary batteries, gases may be formed on the electrode surfaces, these gases must be able to permeate the separator to recombine.

With regard to the separation, filtration, cleaning, and purification equipment, particularly where microporous polyolefin hollow fibers or flat sheet membranes are used, higher flux rates all obtainable by use of the coatings. Suitable hollow fibers and membrane contactors (e.g., LIQUI-CEL® contactors) are available from CELGARD LLC, Charlotte, N.C.

The following examples serve only to further illustrate aspects of the present invention and should not be construed as limiting the present invention.

The Gurley value is measured using a Model 4120 or 4150 Gurley Densometer from Teledyne Gurley, and is the time in seconds required to pass 10 cc of air through 1 in$^2$ of membrane at a constant pressure of 12.2 in of water. [Ref. ASTM D726(B)]

The electrical resistance (or resistivity) is measured as follows: A R.A.I. AC Milliohm Resistance Meter, Model 2401 and R.A.I. test cell electrode (from RAI Research Corp., Hauppauge, N.Y.) are used. A 31% by wt KOH solution is used to wet the sample. Samples should not be dry when tested. The results, reported in milliohm-inch$^2$.

EXAMPLES

Example 1

A solution of the coating was prepared by adding 2g Soarnol K3835N resin to a 60:40 2-propanol/water (i.e., 60 ml 2-propanol, 40 ml demineralized water). The EVOH was dissolved by stirring at 70° C. MAPEG D0400 is added and stirred for 10 minutes.

Example 2

Circular samples (55 mm diameter) of microporous polypropylene membrane (CELGARD® 2500, 2402, 2400, & 2456) was immersed in the solution (Example 1) for up to 10 minutes 40–50° C. with stirring. After removal from the solution, excess solution was removed from the sample with a paper towel. The sample was dried in a hot air oven (50° C.) for 30 minutes.

Example 3

The coated samples were tested as set forth in TABLE 1.

TABLE 1

| SAMPLE ID | GURLEY | COAT TIME | % ADD ON | ER | WATER WETTABLE | PORE WIDTH | PORE LENGTH |
|---|---|---|---|---|---|---|---|
| 2500 Control | 8.8 | | | | | 0.0551 | 0.2059 |
| 2500 Coated with MAPEG | 8.3 | Dip coat | 4.1 | 9.8–infinity | No | | |
| 2500 Coated with Mixture | 10.1 | Dip coat | 15.6 | 5.5 | Instantly | | |
| 2402 Control | 27 | | | | | 0.0499 | 0.1376 |
| 2402 Coated with MAPEG | 37.8 | 10 min | 3.1 | 54–infinity | No | | |
| 2402 Coated with Mixture | 76.7 | 10 min | 14.2 | 12.4 | Instantly | | |
| 2400 Control | 25.1 | | | | | 0.0433 | 0.1228 |
| 2400 Coated with MAPEG | 28 | 10 min | 3.9 | 600–infinity | No | | |
| 2400 Coated with Mixture | 40.7 | 10 min | 13.2 | 9.7 | Slowly | | |
| 2456 Control | 17.3 | | | | | 0.0440 | 0.1390 |
| 2456 Coated with MAPEG | 15.6 | 10 min | 13.2 | 9.7–infinity | No | | |
| 2456 Coated with Mixture | 29.4 | 10 min | 14.5 | 21.2 | Slowly | | |

Example 4

A coating of 3% Soarnol K3835N and 0.7% Mapeg D0400 was pattern coated on to a microporous polypropylene membrane (CELGARD 2502). The pattern was formed by dropping 20 microliters of the coating solution at a distance of one half inch between drops. The coated membrane was air dried and then dried in a hot air oven (50° C.) for 30 minutes. The dried coated film had an ER of 46 milliohm/in$^2$ (due to ionic conduction through the hydrophilic region) and gas flux of 12 cc/psi/min (due to gas flow through the hydrophobic regions).

Example 5

The surface energy of a polypropylene film was modified by polymerizing triethylene glycol divinyl ether to improve its hydrophilicity by raising its surface energy value to 48 dynes/cm (as measured by a Dyne test solution kit from Pillar Technologies, Inc. of Hartland, Wis.). The modified film was then coated with a solution of 1.5% EVOH (EVAL F104) in 60/40 2-propanol/water followed by drying in a hot air oven (50° C.) for 30 minutes. The final film was wetted out by water instantly.

Example 6

The surface energy of polypropylene film was modified to 48 dynes/cm (as measured by a Dyne test solution kit) by coating film surface with a solution of 0.7% polyethylene glycol diolate (Mapeg DO 400). The modified film was then immersed in a solution of 2% Soarnol K3835N in 60/40 2-propanol/water for 30 seconds and dried in a hot oven at 50° C. for 30 minutes. The final film was water wettable.

Example 7

Polypropylene hollow fiber membranes (HF X20-305 from CELGARD LLC of Charlotte N.C.) were immersed in a mixture solution (Example 1) of 0.7% polyethylene glycol diolate and 2% Soarnol K3835N for 2 minutes. The fibers were dried in a hot air oven (50° C.) for 30 minutes. The final fibers were water wettable.

Example 8

An amount of 0.9% nonylphenoxypoly (ethyleneoxy) ethanol (Igepal CO 660) was added to 2% Soarnol K3835N solution and the mixture was used to coat on the polypropylene control.

The results of Examples 5–8 are presented in Table 2–5.

TABLE 2

Coating of a Mixture of MAPEG DO 400 and Soarnol K3835N on Control Polypropylene

| Sample ID | Gurley | % of Weight Gain | ER (mOhm-in$^2$) | Water Wettability |
|---|---|---|---|---|
| Polypropylene Control | 8.8 | — | 2.7 primed w/MeOH | no |
| Polypropylene Coated with 0.7% MAPEG | 8.3 | 4.1 | 9.8–infinity | No |
| Polypropylene Coated with 2% Soarnol K3835 | 11.6 | 14.0 | Infinite | No |
| Double Coat | 10.1 | 15.6 | 5.5 | Yes |
| Single Coat (mixture) | 11.5 | 15.2 | 4.1 | Yes |

TABLE 3

Coating of a Mixture of Surfactant and Soarnol K3835N on Polypropylene Film

| Surfactant | EVOH (Soarnol) | Gurley (sec) | Weight Gain (%) | ER |
|---|---|---|---|---|
| 0.7% MAPEG D0400 | 2% | 10.1 | 15.6 | 5.5 |
| 0.9% IGEPAL C0660 | 2% | 12.6 | 17.3 | 4.4 |
| 0.9% IGEPAL ALONE | | | | 161 |

TABLE 4

Coating of a Mixture of 0.7% MAPEG DO 400 and 2% Soarnol K3835N

| | Weight Gain (%) | Gurley (sec) | Water Flux (L/m$^2$/hr) |
|---|---|---|---|
| Coated with 0.7% MAPEG | 3.1 | 13.4 | 32 |
| Coated with Mixture | 13.6 | 20.2 | 119 |

TABLE 5

2500 Grafted Polymerization With Rapidcure DVE-3 and Coated With 2% Soarnol K3835N

| | Gurley (sec) | Weight Gain (%) | Water Wettability |
|---|---|---|---|
| 2500 Polymerization with 20% DV-3 | 9.1 | 19.2 | No |
| DVE-3 2500 Coated with 15% EVAL F104 | 11.1 | 24.8 | yes |

Example 9

A sample coated as set forth in Example 1 was immersed in at 31% KOH solution at room temperature for 3 months. Every two weeks, the film was removed and dried in a hot air oven (50° C.) for 2 hours, at all times the KOH solution re-wetted immediately the same.

Example 10

A solution of 3% Soarnol K3835N and 0.7% MAPEG D0400 in 60:40 propanol/water was prepared. The solution was pumped through the lumen side of a LIQUI-CEL® membrane contactor (approximately 1.12 square meters lumen side surface area) having X20-240 CELGARD® hollow fibers at a pressure of 3 psi for 20 minutes. The contactors were dried in a hot air oven (50° C.) for 12 hours. (In commercial operation, drying time may be reduced to 5 minutes.) The contactors were very hydrophilic. Water flow (from shellside) at various pressures is set forth in Table 6.

TABLE 6

| | Pressure-in (psi) | Pressure-out (psi) | Flow (cc/min) |
|---|---|---|---|
| Contactor 1 | 5 | 0.5 | 440 |
| | 10 | 1.5 | 940 |
| | 15 | 1.75 | 1240 |
| | 20 | 2.5 | 1575 |
| | 25 | 3.4 | 1800 |
| | 30 | 4.1 | 2160 |
| | 35 | 5.1 | 2350 |
| Contactor 2 | 5 | 0.5 | 500 |
| | 10 | 1.7 | 1080 |
| | 15 | 2.3 | 1400 |
| | 20 | 3.4 | 1750 |
| | 25 | 4.6 | 2180 |
| | 30 | 5.5 | 2440 |
| | 35 | 6.5 | 2600 |

The contractors were then dried for 24 hours and left at room temperature for three weeks. The contactors were still very hydrophilic. Water flow (from shellside) at various pressure is set forth in Table 7.

TABLE 7

|  | Pressure-in (psi) | Pressure-out (psi) | Flow (cc/min) |
|---|---|---|---|
| Contactor 1 | 5 | 0.5 | 475 |
|  | 10 | 1.2 | 996 |
|  | 15 | 1.75 | 1400 |
|  | 20 | 2.75 | 1850 |
|  | 25 | 3.8 | 2000 |
|  | 30 | 4.8 | 2360 |
|  | 35 | 6.2 | 2660 |
| Contactor 2 | 5 | 1.0 | 740 |
|  | 10 | 1.7 | 1320 |
|  | 15 | 2.8 | 1650 |
|  | 20 | 3.8 | 2000 |
|  | 25 | 4.9 | 2380 |
|  | 30 | 6.8 | 2652 |
|  | 35 | 7.7 | 2950 |

Many other modifications and variations of the present invention are possible to the skilled practitioner in the field in light of the teachings herein. It is therefore understood that, within the scope of the claims, the present invention can be practiced other than as herein specifically described.

What is claimed is:

1. A battery separator comprising
a polyolefin microporous membrane having a coating containing a surfactant and an ethylene vinyl alcohol copolymer.

2. The membrane of claim 1, where said polyolefin has a surface energy of equal to or less than the surface energy of polyethylene.

3. The membrane of claim 1, where said polyolefin is selected from the group consisting of polyethylene, polypropylene, polybutylene, polymethylpentene, and copolymers thereof.

4. The membrane of claim 1, where said surfactant raises the surface energy of the polyolefin to about 48 dynes/cm.

5. The membrane of claim 1, where said surfactant is selected from the group consisting of polyethylene glycol diolate, nonylphenoxypoly(ethyleneoxy) ethanol, triethylene glycol divinyl ether, and combinations thereof.

6. The membrane of claim 1, where said coating comprises about 10–18% by weight of said membrane.

7. A battery comprising an anode, a cathode, an electrolyte, and a separator according to claim 1.

8. A hydrophilic polyolefin battery separator comprising
a polyolefin microporous membrane having a surface energy of equal to or less than the surface energy of polyethylene, and
a coating on said membrane and being about 10–18% by weight of said membrane, and said coating containing an ethylene vinyl alcohol copolymer and a surfactant adapted to raise the surface energy of said membrane to about 48 dynes/cm.

9. The separator according to claim 8 wherein said surfactant is selected from the group consisting of polyethylene glycol diolate, nonylphenoxypoly(ethyleneoxy) ethanol, triethylene glycol divinyl ether, and combinations thereof.

10. The separator according to claim 8 wherein said polyolefin is selected from the group consisting of polyethylene, polypropylene, polybutylene, polymethylpentene, and copolymers thereof.

11. The separator according to claim 10 wherein said polyolefin being polypropylene and copolymers thereof.

12. A battery comprising an anode, a cathode, an electrolyte, and the separator of claim 8.

* * * * *